Sept. 15, 1942.   G. B. HUME   2,295,847
INFANT FEEDING SPOON
Filed Feb. 26, 1941
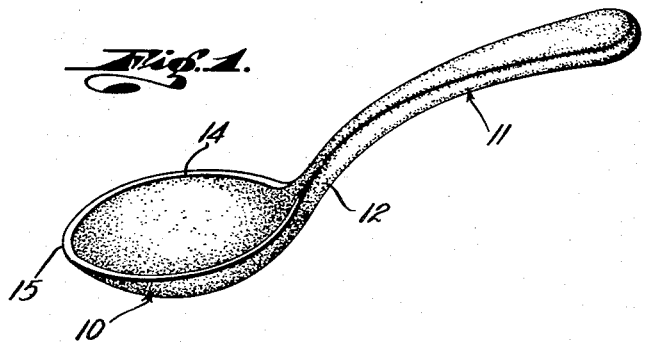
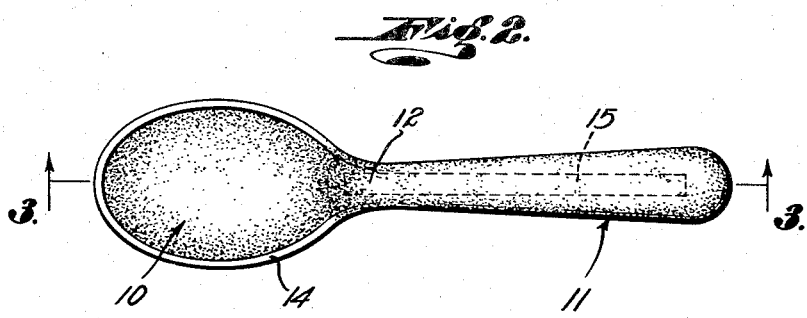
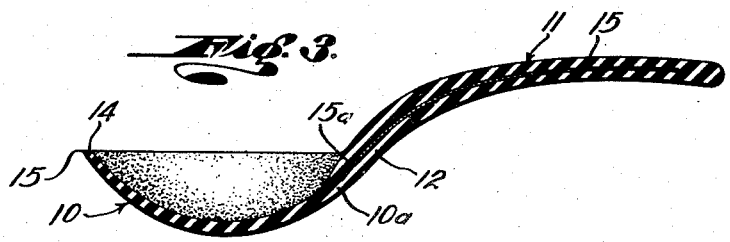
Inventor
GERTRUDE B. HUME
H. Calvin White
Attorney Patented Sept. 15, 1942

2,295,847

UNITED STATES PATENT OFFICE 2,295,847

INFANT FEEDING SPOON

Gertrude B. Hume, Claremont, Calif.

Application February 26, 1941, Serial No. 380,651

5 Claims. (Cl. 30—328)

This invention has for its primary object to provide an improved infant feeding spoon having such characteristics of use and appeal to the infant, as to render it superior in a number of respects to all various kinds of spoons heretofore known.

In its preferred form, the present spoon is made entirely of rubber, except for the handle reinforcing or stiffening element, the term "rubber" being intended to include natural as well as synthetic rubber of known compositions. It is desirable that the rubber be tasteless and that it also be substantially non-porous, but readily flexible and soft to the infant's bite, for various particularly important reasons hereinafter explained. Satisfactory results have been obtained using latex base rubber, which may carry pigment giving the spoon any desired color.

Forming the spoon, or at least the bowl of the spoon, of readily flexible and soft rubber, is of essential importance in agreeably making the transition from the rubber nipple to the metal spoon in the feeding of the growing infant. Being made of soft rubber and in flexible form, the spoon protects the infant's tender gums and avoids injury or discomfort to the mouth by the infant's jerky movements. The present spoon is intended to be especially helpful during the time of teething, when the infant likes to bite a rubber surface. Thus the important result is obtained of causing the infant to associate mouth-comfort with the taking of food. To further add to the desirability of the spoon in these respects, the bowl preferably is made with a beveled or flattened rim which avoids any discomfort when the gums close on the spoon. Another advantage resulting from the flexibility of the bowl and its flattened rim is that the soft edge of the spoon offers a comfortable and efficient wiper to gather food around the infant's mouth during the process of feeding. The softness and flexibility of the bowl at the rim permits the rim edge to conform to the surface over which it is moved, and thereby serve very effectively as a wiper.

The invention embodies additional features of importance in the handle structure and its association with the bowl. In this regard, the invention is characterized by the provision of a simple form of handle reinforcing or stiffening element which gives complete firmness to the handle, while holding the bowl in proper position to contain food and yet leaving the bowl so flexible as not to injure the mouth of the infant. The handle stiffening element may consist most simply and economically of a metallic strip extending longitudinally within the handle and terminating in the rear portion or wall of the bowl at a position which, as indicated, will properly support the bowl and yet allow its free flexure.

All the above mentioned features and objects of the invention, as well as various additional details, will be understood to better advantage from the following description of the invention as embodied in a typical and preferred form. Reference is had throughout the description to the accompanying drawing, in which:

Fig. 1 is a view showing the spoon in perspective;

Fig. 2 is a plan view of the spoon; and

Fig. 3 is a longitudinal section on line 3—3 of Fig. 2.

As illustrated in the drawing, preferably the entire body of the spoon including the bowl 10 and handle 11 is made of rubber, rendering the spoon capable of manufacture by a simple molding operation. As desirable in an infant's spoon, the handle 11 has a considerable degree of curvature and joins with the bowl 10 at the neck 12 curving somewhat gradually away from the back portion or rear wall 10a of the bowl. For the reasons heretofore explained, the rim 14 of the bowl is substantially flattened to avoid any discomfort to the infant in biting against it, while at the same time providing a relatively sharp outer edge 15 rendering the spoon efficient as a wiper as explained above. With the reinforcing or stiffening element confined for the most part to the handle, the bowl 10 is left freely flexible and deformable, these characteristics together with the inherent softness of the rubber, making the spoon agreeable to the infant and favoring its use as a transition to the metal spoon.

While in the broader aspects of the invention, any suitable means may be employed for rendering the handle 11 relatively stiff and leaving the bowl attached or supported so as to have ready flexibility, I preferably reinforce the handle using the simple form of stiffening element 15 because of its particular suitability and adaptability to easy and economical manufacture of the spoon. This stiffening element 15 may consist simply of a metallic strip, proportioned substantially as shown, imbedded and extending longitudinally within the handle. This element may be made of brass or copper alloy having rather limited elasticity so that while the elasticity of the rubber normally will enable the handle to retain a predetermined shape or degree of curvature, it may be bent into different form or curvature by reason of the capacity of the stiffening element for retaining flexed deformation. It is important that the bowl 10 be properly supported from the handle to permit any degree of flexure of the bowl without ultimate change of shape and without ultimate breaking of the rubber at the throat 12. For this reason, the forward end 15a of the stiffening element preferably is extended into the wall 10a of the bowl as illustrated, thus giving added support to the bowl at its point of direct flexure with relation to the handle. The thickness of the rubber about the forward end 15a of the stiffening element, is made sufficient to assure against the end of the element breaking through the rubber as a result of repeated and continued flexures of the bowl.

I claim:

1. An infant feeding spoon comprising a handle and bowl both formed integrally of rubber and the handle being relatively stiff, the bowl being soft to the infant's bite and freely flexible about its juncture with the handle.

2. An infant feeding spoon comprising a handle and bowl both formed integrally of rubber, the bowl being soft to the infant's bite and freely flexible about its juncture with the handle, and means stiffening the handle to the location of said juncture.

3. An infant feeding spoon comprising a handle connected by a curved neck to a bowl and all formed integrally of rubber, the bowl being freely flexible and soft to the infant's bite, and a stiffening element extending longitudinally within the handle and neck and terminating in the rear wall of the bowl to thereby support the bowl and yet permit its free flexibility.

4. An infant feeding spoon comprising a handle connected by a curved neck to a bowl and all formed integrally of rubber, the bowl being freely flexible and soft to the infant's bite, and a curved metallic strip extending longitudinally within the handle and neck and terminating within the rear wall of the bowl to thereby support the bowl and yet permit its free flexibility.

5. An infant feeding spoon comprising a handle connected by a curved neck to a bowl and all formed integrally of rubber, the bowl being freely flexible and soft to the infant's bite, and a deformable metallic strip extending longitudinally within the handle and neck and terminating within the rear wall of the bowl to thereby support the bowl and yet permit its free flexibility, said strip having such limited resiliency as to retain different shapes when deformed.

GERTRUDE B. HUME.